(12) United States Patent
Ferrante

(10) Patent No.: US 9,801,367 B2
(45) Date of Patent: Oct. 31, 2017

(54) ENVIRONMENTALLY-FRIENDLY DEVICE FOR TRAPPING ANIMALS

(71) Applicant: Sergio Ferrante, Marsascala (MT)

(72) Inventor: Sergio Ferrante, Marsascala (MT)

( * ) Notice: Subject to any disclaimer, the term of this patent is extended or adjusted under 35 U.S.C. 154(b) by 328 days.

(21) Appl. No.: 14/761,116

(22) PCT Filed: Jan. 15, 2014

(86) PCT No.: PCT/IB2014/058288
§ 371 (c)(1),
(2) Date: Jul. 15, 2015

(87) PCT Pub. No.: WO2014/111857
PCT Pub. Date: Jul. 24, 2014

(65) Prior Publication Data
US 2015/0335005 A1    Nov. 26, 2015

(30) Foreign Application Priority Data

Jan. 16, 2013   (IT) ................................ FI2013A0013

(51) Int. Cl.
*A01M 23/04* (2006.01)
*A01M 23/06* (2006.01)
(Continued)

(52) U.S. Cl.
CPC ............ *A01M 23/04* (2013.01); *A01M 23/06* (2013.01); *A01M 23/10* (2013.01); *A01M 23/14* (2013.01); *A01M 23/20* (2013.01)

(58) Field of Classification Search
CPC .............................. A01M 23/04; A01M 23/06
(Continued)

(56) References Cited

U.S. PATENT DOCUMENTS 864,200 A * 8/1907 Shelton .................. A01M 21/00
43/72
1,006,701 A * 10/1911 Sutemeier ............. A01M 21/00
43/72
(Continued)

FOREIGN PATENT DOCUMENTS

AU   WO 2013173866 A1 * 11/2013 ............ A01M 23/04

*Primary Examiner* — Darren W Ark
*Assistant Examiner* — Danielle Clerkley
(74) *Attorney, Agent, or Firm* — Pearne & Gordon LLP

(57) ABSTRACT

An environmentally friendly device for trapping animals comprising a collection container (3) comprising an upper opening (3a), an intermediate supporting frame (4), forming a drop duct (8) and such that it at least partly closes the opening (3a) of said collection container (3), a closing guard (5), which can be superposed on the intermediate supporting frame (4), comprising an inlet (6) and a compartment forming a trapping corridor (7), a trapping mechanism (9) supported by the frame (4) and positioned over the drop duct (8), comprising a rotary surface (10) having a main direction of extension (X) extending along a longitudinal axis (10a) coinciding with the direction of entry into the trapping corridor (7), being designed to close the top of the drop duct (8) and to form the treadable surface of the trapping corridor (7). The trapping mechanism (9) comprises two plates (14a, 14b) connected to each other by the rotary surface (10), which is positioned orthogonally to each of them. Each time it is activated the rotary surface and the two plates (10) complete a 180° rotation about an axis (9a) of symmetry which is transversal to said longitudinal axis (10a) coinciding with the direction of entry into the trapping corridor (7).

15 Claims, 2 Drawing Sheets

(51) Int. Cl.
*A01M 23/10* (2006.01)
*A01M 23/14* (2006.01)
*A01M 23/20* (2006.01)

(58) Field of Classification Search
USPC .............................. 43/61, 69, 71, 74, 70, 72
See application file for complete search history.

(56) References Cited

U.S. PATENT DOCUMENTS

| | | | | |
|---|---|---|---|---|
| 1,077,666 A * | 11/1913 | Branitzky | ............. | A01M 21/00 |
| | | | | 43/72 |
| 1,387,129 A * | 8/1921 | Croyle | .................. | A01M 23/00 |
| | | | | 43/70 |
| 2,122,147 A * | 6/1938 | Lamp | ..................... | A01M 23/04 |
| | | | | 43/67 |
| 2,163,577 A * | 6/1939 | Allen | .................... | A01M 23/02 |
| | | | | 43/70 |
| 3,791,065 A * | 2/1974 | Snow | .................... | A01M 23/04 |
| | | | | 43/69 |
| 5,471,781 A * | 12/1995 | Vine | ..................... | A01M 23/04 |
| | | | | 43/69 |
| 5,519,962 A | 5/1996 | Cerullo | | |
| 6,016,623 A | 1/2000 | Celestine | | |
| 7,854,089 B2 * | 12/2010 | Deibert | ................. | A01M 19/00 |
| | | | | 43/71 |
| 2006/0026893 A1 * | 2/2006 | Sears | .................... | A01M 23/06 |
| | | | | 43/69 |
| 2010/0257772 A1 * | 10/2010 | Uhlik | .................... | A01M 23/06 |
| | | | | 43/61 |
| 2014/0352199 A1 * | 12/2014 | Matney | ................. | A01M 23/04 |
| | | | | 43/61 |

* cited by examiner

ENVIRONMENTALLY-FRIENDLY DEVICE FOR TRAPPING ANIMALS

The present invention relates to an environmentally friendly device for trapping animals.

In particular, the present invention has advantageous application in the disinfestation of urban or agricultural environments from mice, rats and other harmful animals of small to medium size.

Various types of traps are known, for example of the steel-jaw or labyrinth type, which attract the animal with poisoned baits. However, such solutions enable only one animal to be trapped at time, besides causing a safety problem for humans given the use of poison.

Moreover, the trapped animal emits olfactory danger signals, such as biological secretions, which if smelled by other animals would prevent further specimens from being trapped.

To remedy these limitations, solutions have been devised which involve the use of devices capable of capturing several animals in sequence, while preventing the possibility of odorous danger signals being emitted by the trapped animal into the air and without using poisonous baits.

Such devices comprise a structure made up of an upper part which includes an inlet and a lure and trap assembly, and a lower part for collecting the trapped animals.

The two parts can be separated from each other and sealingly connected in such a manner as to communicate through a discharge door that opens downward into the lower part.

The trapping mechanism consists of four rotating platforms, which operate continuously and are set at 90° angles to one another. These platforms are made to rotate about a common carrier shaft by means of an electromechanical device activated by specific sensors.

The carrier shaft, about which the platforms rotate, is positioned longitudinally along the trapping corridor that the animal enters into. The platforms thus rotate transversely to the direction of entry of the animal. The movement of the discharge door is synchronized with the rotation of the platforms.

The animals enter into the upper portion, attracted by scented baits placed in a specially made compartment in said upper part, and once in the trapping corridor, trigger the sensors which activate the rotation of the platforms.

The mechanism will cause the platform whereupon the animal steps to rotate downward a quarter of a turn and the animal will thus be dropped into the receptacle that lies immediately below the trapping mechanism.

This device has the drawback of being scarcely reliable, since the rotation of the trapping mechanism pushes the animal sideways with the risk that the animal might be caught between the platform following the one it has stepped on and the wall of the trapping corridor or feeder.

Furthermore, the entrance opening remains constantly open even during the actual trapping phase involving the rotation of the platforms, with the risk of the animal getting cut and the mechanism jammed.

Moreover, the scented baits are confined within a compartment that does not enable optimal diffusion of the scent and hence does not ensure effective baiting of the animals.

Finally, the device is fragile and delicate as well as having considerable bulk, which precludes an easy transport thereof, since the structure can be neither compacted nor stacked.

The object of the present invention, therefore, is to realize an environmentally friendly device for trapping animals which overcomes the drawbacks to be found in the prior art.

In particular, it is an object of the present invention to provide an environmentally friendly device for trapping animals which ensures that the animal is trapped while avoiding risks of the mechanism getting jammed, so as to permit a continuous use of the device itself.

A further object of the present invention is to provide an environmentally friendly device for trapping animals which is structurally simple and sturdy, has a compact size, while nonetheless maximising capacity and the ability to trap animals of considerable size, and above all can be compacted and stacked to enable it to be easily transported.

Finally, it is an object of the present invention to present an environmentally friendly device for trapping animals which assures a better diffusion of the odour of the scented baits.

The stated technical task and specified objects are substantially achieved by an environmentally friendly device for trapping animals comprising the technical features set forth in one or more of the claims hereunder.

Additional features and advantages of the present invention will be more apparent from the approximate, and thus not limiting, description, of preferred but not exclusive embodiments of an environmentally friendly device for trapping animals, as illustrated in the appended drawings in which.

Figure 1:
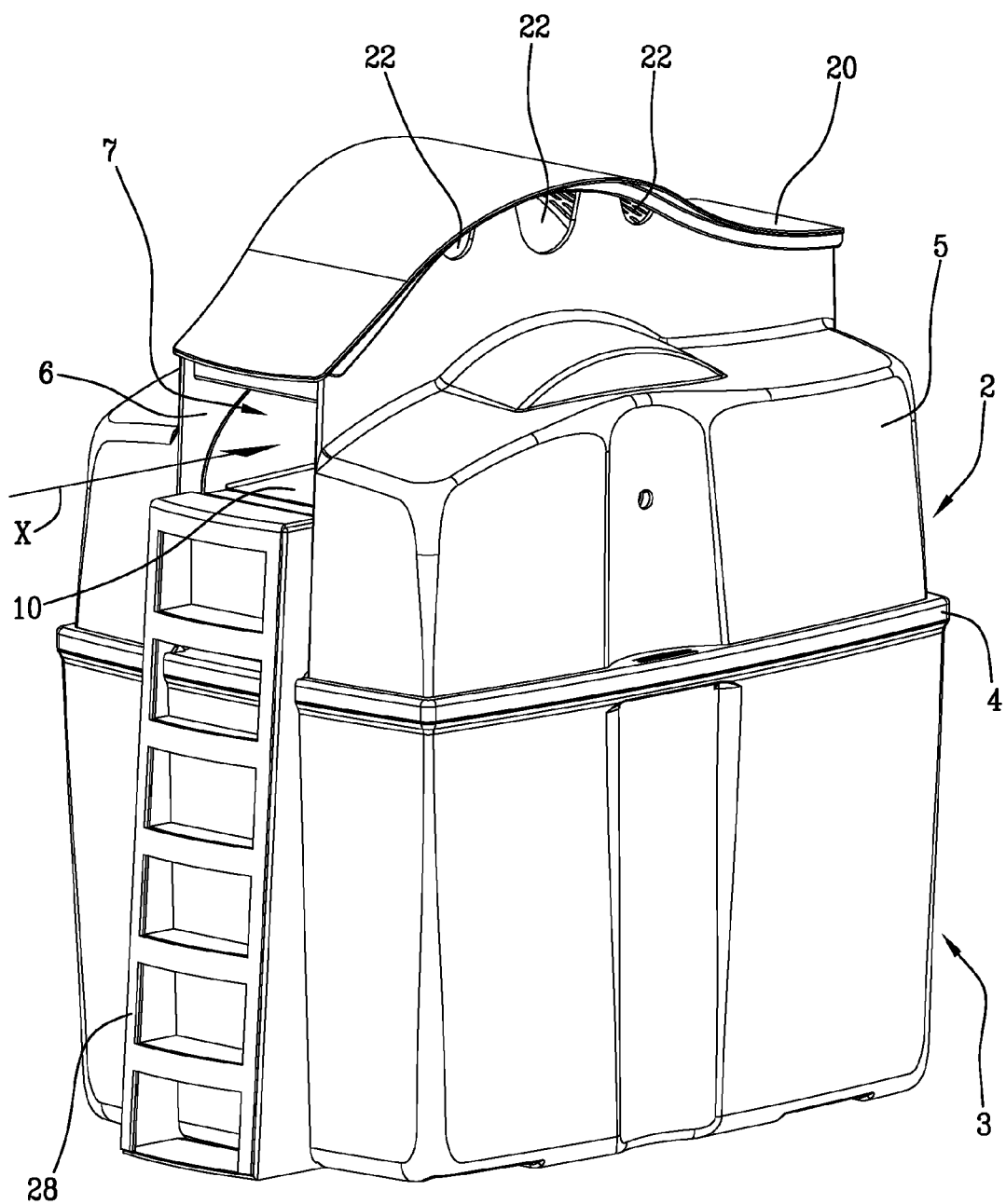
FIG. 1 is a perspective view of an environmentally friendly device for trapping animals in accordance with the present invention.

An environmentally friendly device for trapping animals has been generically indicated with the reference number 1.

The device 1, as a whole, consists of an enclosure, preferably made of plastic, divided into two halves, an upper one 2 and a lower one 3. The lower half 3 is a collection container having an upper opening 3a, where the trapped animals are accumulated.

The upper part comprises a number of elements; in particular, it comprises an intermediate supporting frame 4 and a closing guard 5, which can be superposed on the supporting frame 4.

The guard 5 has an inlet 6 leading into a compartment forming the trapping corridor 7.

The frame 4, on the other hand, has a drop duct 8 and can be placed above the collection container 3 and at least partly closes off the upper opening 3a.

A trapping mechanism 9 is mounted on the supporting frame 4 and positioned over the drop duct 8; it comprises a rotary surface 10 having a main direction of extension X extending along a longitudinal axis 10a, which coincides with the direction of entry X into the trapping corridor 7 (which in turn coincides with the head-to-tail longitudinal axis of the trapped animal).

The rotary surface 10 closes off the drop duct 8 from above in such a way as to form the treadable surface of the trapping corridor 7.

Advantageously, each time the trapping mechanism 9 is activated, the rotary surface 10 completes a 180° rotation about an axis 9a of symmetry transversal to the longitudinal axis 10a of the surface itself, which coincides with the direction of entry X into the trapping corridor 7.

In other words, the rotary surface 10 of the device 1 has the axis 9a of symmetry as its rotation axis.

Preferably, the axis 9a of symmetry is positioned perpendicularly to the longitudinal axis 10a of the rotary surface 10.

Therefore, according to the present embodiment, the rotation axis of the rotary surface 10 is perpendicular to the main direction of extension X, which coincides with the direction of entry into the corridor 7 (and with the head-to-tail axis of the trapped animal).

The trapping mechanism 9 further comprises a spring 12 wound in a spiral, which drives the rotation of the rotary surface 10.

Advantageously, the closing guard 5 is shaped so as to provide the inlet 6 with an opening such as to prevent the animal present in the trapping corridor 7 from turning around in an attempt to escape from the device 1 during its operation. The guard 5 with the inlet 6 and the rotary surface 10 are configured in such a way that the rotary surface 10 shuts off the animal's escape route within a few degrees of rotation on being raised in the direction of the guard 5.

In particular, the rotary surface 10 rotates in the same direction as the direction of forward movement X of the animal itself inside the device 1, so that during the rotation of the surface 10, the latter is able to shut off the entry route 6 into the trapping corridor 7 within the first 30°, preferably 20°, of rotation, thereby trapping the animal inside the corridor 7.

The rotary surface 10 is kept in the horizontal home position by means of a locking system 11 and is activated by an activation system 13, which is sensitive to the presence of an animal in the trapping corridor 7.

The activation system 13 activates the trapping mechanism 9 by means of an actuator 13a which releases the locking system 11 and trips the spring 12, causing the rotary surface 10 to overturn in the direction of forward movement of the animal itself.

The activation system 13 can be a mechanical trigger, a proximity sensor, a volumetric sensor, an optical sensor, a lever-operated switch, etc. . . . .

The spring 12 which activates the machine has a hub 29 equipped with a non-return mechanism 30 comprising a simple gear wheel 27 with a retaining tooth or hooking element 32 and a rotating part 31 in the form of an outer shell keyed onto the shaft 15 of the trapping mechanism 9. The device is loaded from the outside simply by rotating the hub 29 of the spring in the allowed direction, and the spring 12 will be wound around the hub 29.

During operation, on the other hand, it is the rotating part or outer shell 31 which is tripped and acts on the rotor until the spring 12 is completely released.

In greater detail, the trapping mechanism 9 comprises two preferably elliptical plates 14a and 14b, coupled or connected to each other by the aforesaid rotary surface 10, which is positioned orthogonally to each of them along the larger diameter.

In other words, the preferably elliptical plates 14a and 14b are positioned at the lateral ends of the rotary surface 10 so as to form a single assembly in which the rotary surface 10 represents the treadable surface for the animal and the plates 14a and 14b form the side walls thereof, normally positioned vertically.

Advantageously, the surface configuration of the rotary surface 10 and of the plates 14a 14b facing the trapping corridor 7 are such as to prevent the trapped animal from finding points to cling onto so as remain partly off the rotary surface 10 and cause a possible jamming of the device 1. Preferably, the elliptical plates 14a and 14b have an identical larger diameter and a slightly different smaller diameter.

The assembly made up of the rotary surface 10 and elliptical plates 14a and 14b is externally equipped with two small rods 15, positioned in the centre of each oval wall of the plates, which enable said assembly of the trapping mechanism 9 to be suspended on the hubs provided on the supporting frame 4.

The small rods 15 have a different shape, cylindrical 15a in proximity to the walls of the plates and prismatic 15b toward the peripheral areas (hexagonal cross section or with another polygonal shape).

The aforesaid steel spring 12 wound in a spiral is coupled to the prismatic part 15b of one of the external small rods 15 and drives the rotation of the rotary surface 10 and the plates 14a and 14b.

Accessories can be installed on the other small rod; these can exploit the energy produced by the spring 12 and enable some advanced functions (indicator of animals trapped, automatic resetting of the trigger . . . ).

The trapping mechanism 9, in particular the rotary surface 10 and the two plates 14a and 14b, is constrained inside the drop duct 8, which extends vertically through the supporting frame 4 down to the opening 3a of the collection container 3. As noted previously, the rotary surface 9 closes off said duct 8 and forms the treadable surface of the trapping corridor 7.

During operation, which involves a 180° rotation of the rotary surface 10 about the transversal axis 9a, relative to the home position in which the rotary surface 10 is horizontal, the rotary surface 10 flips over, turning upside-down and dropping its contents into the lower part 3 of the device.

On completing a 180° rotation, the trapping mechanism 9, which can rotate as many times as the loading of the spring 12 allows, will once again be in a horizontal position, closing off the drop duct 8 and ready for the next triggering.

The trapping mechanism 9 is kept in position by the aforesaid locking system 11, which, preferably, intercepts a wall of a plate 14a.

The locking mechanism 11 comprises a retaining hook which directly engages a slit 16 present on one of the walls of the elliptical plate 14a. The locking system 11 works by sustaining the weight of the trapping mechanism 9 (and of the animal that may be inside it) and withstanding the driving force of the spring 12.

Figure 2:
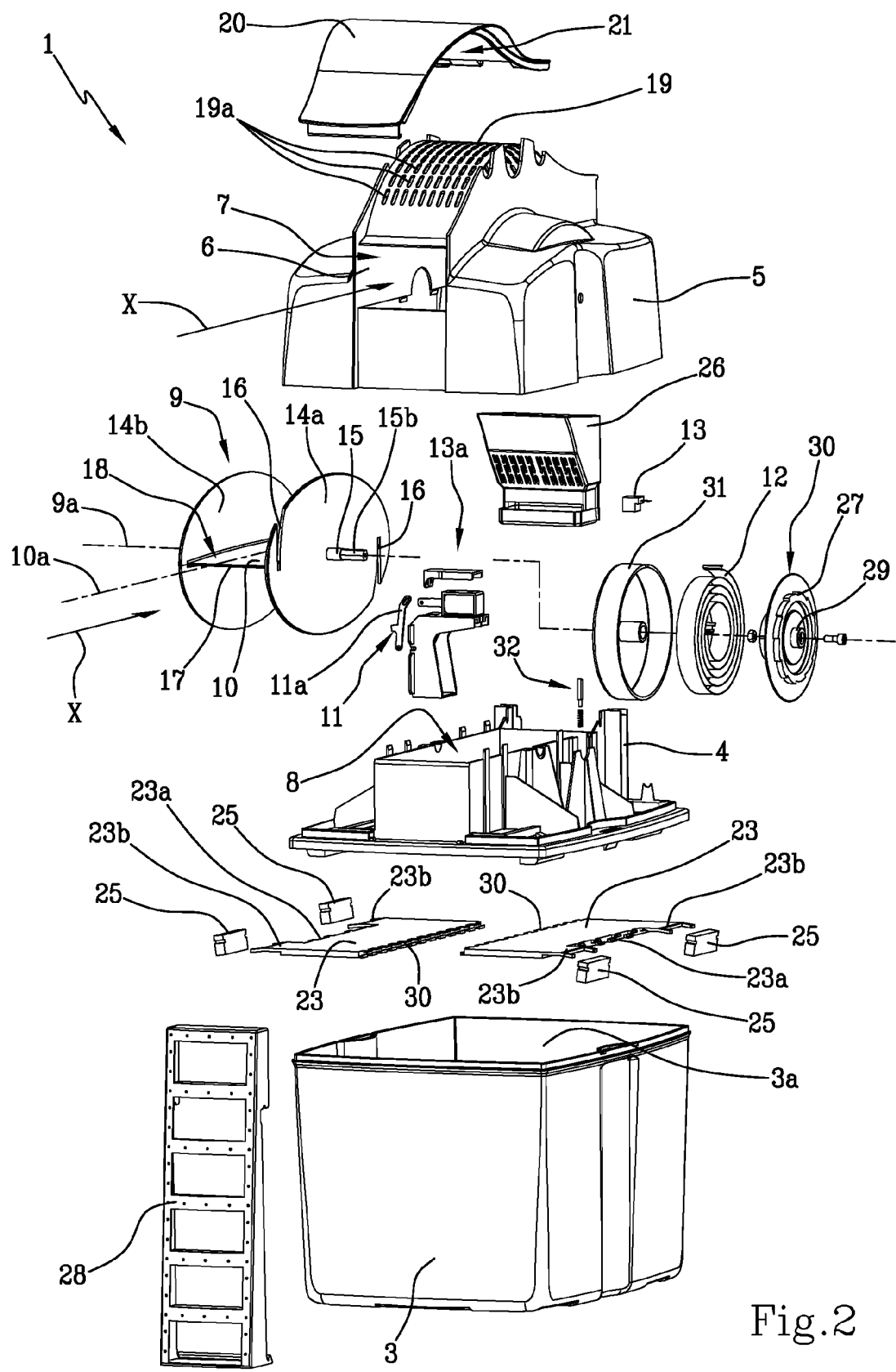
FIG. 2 is an exploded view of the device illustrated in FIG. 1.

With particular reference to what is illustrated in FIG. 2, it may be observed that the actuator 13a interacts with the locking system 11, which in this specific case is represented by a lever 11a comprising said retaining hook engageable in one of the slits 16 of the plate 14a, in particular in the slit 16 open at the bottom.

The rotary surface 10 comprises a respective flexible or overturnable tab 18 along each free side 17, which ensures the freedom of rotation of the trapping mechanism 9 inside its housing even if a part of the trapped animal (the tail for example) is off the rotary surface 10 itself. Without this feature the rotation could be interrupted, thus jamming the device.

Completing the upper part of the device, for the dual purpose of protecting the content thereof and completing the housing of the trapping mechanism 9, is the so-called closing guard 5, which in fact constitutes the counter-frame of the device, mating perfectly with the supporting frame 4.

Inside the guard 5 there are some vertical walls that mate with respective structures of the supporting frame 4 and represent the lateral walls of the trapping corridor 7.

The trapping corridor 7 has a geometry with a variable cross section that expands upwards, a geometry that is such as to aid the rotation of the rotary surface 10.

The trapping corridor 7 is closed off from above by a lid 19 comprising a plurality of holes (or slits) 19a, which forms the ceiling of the trapping corridor 7.

The guard 5 comprises a removable dome 20 placed over the lid 19; together with the lid 19, the dome forms a hollow space 21 communicating with the trapping corridor 7 solely through the holes 19a.

The hollow space 21 is designed to contain scented baits, which can make it easier to lure the animals to be trapped. It is envisaged that the scented baits, in the form of a low-cost granulated product, is preferably packaged in thin sachets that can be easily placed inside the hollow space itself. Given the feature of there being a large surface of exchange in relation to the mass of the sachet, the scented bait thus composed is able to maximize the luring effect even when limited amounts of ground bait products are used.

To enable optimal diffusion of the odours, apertures 22 of variable size are present in the upper part of the vertical walls of the trapping corridor.

The trapping corridor 7 is open at the front, facilitating the entry of the animal to be trapped. Upon entering into the trapping corridor 7, the animal will find itself walking directly on the rotary surface 10.

As already explained, as soon as the activation system 13 is triggered, the rotation of the rotary surface 10 will close off the inlet 6 of the trapping corridor 7 within the first 30° of rotation, thus trapping the animal inside.

Below the supporting frame 4, in particular below the rotary surface 10 of the trapping mechanism 9, a second trapping system comprising two trap doors 23 is present. Advantageously, the two trap doors 23 are laterally hinged along a respective side 23a which is parallel with the direction X of extension of the trapping corridor 7.

The trap doors 23 are horizontal in the home position and positioned at the point that is closest, but without contact, to the point of tangency with the plates 14a and 14b where the radius is smallest. In this position they completely close off the collection container 3 from above and the drop duct 8 from below.

In the operating position, on the other hand, the trap doors 23 are preferably able to open only downwards.

The purpose of the two trap doors 23 is therefore to isolate the lower container from the upper part of the device 1. The trap doors 23 comprise several tabs 23b on their outer side part, installed on which there is also a mechanism 25 for returning them to the horizontal home position.

In particular, said return mechanism 25 can preferably be a system of counterweights or springs.

In the home position, the two trap doors 23 are kept in the horizontal closed position by the action of the return mechanism 25 itself. The balancing performed by said return mechanism 25 is such as to ensure the right force for closing the trap doors 23 against a rubber stop.

Since the trap doors 23 are positioned almost in contact with the point of tangency at the smallest radius of the plates 14a and 14b, and considering the progressively increasing geometry of the radius thereof and the trajectory followed during their rotation, the perimeter edges of the plates 14a and 14b will exert a gradual push on the trap doors 23 already in the first 90° of rotation, causing them to become unbalanced and open. In the final phase of the rotation, in the last 90°, the radius at the point of tangency of the plates decreases again and the trap doors 23 close again. Advantageously, as a result of the asymmetry of the ovals of the plates, which as noted have an identical larger diameter but a different smaller diameter, the two trap doors 23 will open and close with a time offset such as to ensure lower inertia and correct repositioning of the same during closing. In other words, the system of rotation of the two trap doors 23 is such as to prevent any jamming during closing, since each individual trap door 23 is independent of the other.

Advantageously, the trap doors 23 are such as to sealingly isolate the lower collection container 3 from the drop duct 8.

Preferably, in fact, the surface of mutual contact of the trap doors 23 comprises a seal 30 which enables a sealed closure thereof.

On the end opposite the inlet of the trapping corridor 7 there is a feeder 26, where additional baits can be positioned. The feeder 26 is directly accessible through the dome 20, enabling rapid maintenance.

In front of the feeder 26 there is the activation system 13, which is sensitive to the animal's presence. With its presence and its activity, the animal triggers the activation system 13 of the trapping mechanism 9, which deactivates the locking system 11, releasing the plate 14a, which thus rotates 180° due to the action of the spring, closes off the escape route and overturns the rotary surface 10, throwing the animal into the collection container 3 below as a result of centrifugal force and gravity.

Given the particular configuration of the device 1, the inlet of the trapping corridor 7 is at a greater height than the base of the device 1. This height is made reachable by placing a climbing structure 28 in front of the device 1, said structure serving to select the species to be trapped (gently sloping runway, a ladder with Velcro, burial of the lower part in the ground . . . ). In fact, to trap mice or rats it is necessary to have a ladder or an element designed to enable the animal to cling onto it, since these animals climb, whereas an inclined ramp is necessary to trap rabbits or the like.

The lower part of the device 1—the collection container 3—besides being suitably dimensioned to accommodate the trapped animals and optionally a preservative and/or killer liquid, enables the upper part 2 of the machine itself to be placed inside it simply by overturning it, thus providing an arrangement usable for optimizing transport, the size being equal to half that of the machine itself in the operating configuration.

One thus obtains a device of compact dimensions which can be easily transported and stacked if necessary.

The invention achieves the proposed objects, since the particular movement of the trapping mechanism, in particular the 180° overturning of the rotary surface about an axis transversal to the direction of forward movement of the animal, enables the animal itself to be trapped, irrespective of size, without any risk of the mechanism getting jammed or of the animal being cut and possibly attempting to escape through the inlet out of fright. In fact, as soon as the rotary surface starts rotating, it immediately closes off the inlet, imprisoning the animal.

The activation of the trap doors is mechanically driven by the rotation of the trapping mechanism itself, which simplifies the whole structure of the device and enhances reliability.

The amply perforated surface of the lid and the presence of additional windows enable an improved, effective diffusion of the odour emanating from the baits.

Finally, the particular geometry and structural configuration of the device enables it to be transported in a compact manner, without wasting space.

The environmentally friendly device of the present invention has been conceived with reference to infesting rodents such as rats, mice and the like, but the same device, appropriately modified in terms of size and baits, can also be used to trap other infesting animals such as, for example, rabbits.

The invention claimed is:

1. An environmentally friendly device for trapping animals comprising a collection container (3) comprising an upper opening (3a), an intermediate supporting frame (4), forming a drop duct (8) and such that said intermediate supporting frame (4) at least partly closes the opening (3a) of said collection container (3), a closing guard (5) superposed on the intermediate supporting frame (4), said closing guard (5) comprising an inlet (6) and a compartment forming a trapping corridor (7), a trapping mechanism (9) supported by the frame (4) and positioned over the drop duct (8), comprising a rotary surface (10) having a main direction of extension (X) extending along a longitudinal axis (10a) coinciding with a direction of entry into the trapping corridor (7), said rotary surface (10) adapted to close the top of the drop duct (8) and to form the treadable surface of the trapping corridor (7), wherein the trapping mechanism (9) comprises two plates (14a and 14b) connected to each other by the rotary surface (10), which is positioned orthogonally to each of them, said rotary surface (10) and the two plates (14a and 14b) being such as to complete a 180° rotation about an axis (9a) of symmetry which is transversal to said longitudinal axis (10a) coinciding with the direction of entry into the trapping corridor (7).

2. The device according to claim 1, wherein the trapping mechanism (9) comprises a spring (12) wound in a spiral which drives the rotation of the rotary surface (10) in the same direction as a direction of forward movement of an animal, thereby closing the inlet (6).

3. The device according to claim 2, wherein said closing guard (5) with the inlet (6) and the rotary surface (10) are configured in such a way that the rotary surface (10) closes off the animal's escape route within a few degrees of rotation of the rotary surface (10) raised in the direction of the closing guard (5).

4. The device according to claim 1, wherein the trapping mechanism (9) comprises a locking system (11) which keeps the rotary surface (10) stationary in a horizontal home position.

5. The device according to claim 1, wherein said trapping mechanism (9) comprises an activation system (13) which is sensitive to the presence of an animal in the trapping corridor (7), said activation system (13) activates the trapping mechanism (9) by means of an actuator (13a), said actuator (13a) releases the spring (12), causing the rotary surface (10) to overturn in the same direction as a direction of forward movement of an animal.

6. The device according to claim 1, wherein the two plates (14a, 14b) are elliptical and parallel, each of the two plates (14a, 14b) having a larger diameter and a smaller diameter, and wherein said rotary surface (10) passes through the larger diameter of the plates (14a, 14b); said plates (14a, 14b) having an identical larger diameter and different smaller diameter.

7. The device according to claim 6, wherein the trapping mechanism (9) comprises a locking system (11) which keeps the rotary surface (10) stationary in a horizontal home position and wherein the locking system (11) is active on at least one of the two plates (14a, 14b), interfering with a slit (16) made in the surface of said at least one plate (14a).

8. The device according to claim 1, further comprising a pair of trap doors (23) positioned below the supporting frame (4), and which isolate said collection container (3) from the drop duct (8).

9. The device according to claim 8, wherein the trap doors (23) are hinged along a respective side (23a) and parallel with the direction of entry into the trapping corridor (7); said trap doors (23) being horizontal in a home position, and adapted to open only downwards in an operating position.

10. The device according to claim 9, wherein the trap doors (23) comprise a mechanism (25) for returning them to the horizontal home position.

11. The device according to claim 9, wherein the two plates (14a, 14b) are elliptical and parallel, each of the two plates (14a, 14b) having a larger diameter and a smaller diameter, and wherein said rotary surface (10) passes through the larger diameter of the plates (14a, 14b); said plates (14a, 14b) having an identical larger diameter and different smaller diameter; and wherein the trap doors (23) are adapted to open in such a way that they are offset from each other after interference with the plates (14a, 14b) during their rotation.

12. The device according to claim 1, wherein the rotary surface (10) further comprises a flexible tab (18) along each free side (17).

13. The device according to claim 1, wherein the closing guard (5) comprises a lid (19) having a plurality of holes (19a) and a dome (20) for placement over the lid (19); between the lid (19) and the dome (20) there being a hollow space (21) adapted to receive scented baits.

14. The device according to claim 13, further comprising apertures (22) of variable sizes in an upper part of the closing guard (5) to enable improved diffusion of odors from the scented baits.

15. The device according to claim 1, wherein the collection container (3) is configured to contain the supporting frame (4) and the closing guard (5).

* * * * *